United States Patent
Tsai et al.

[11] Patent Number: 6,016,741
[45] Date of Patent: Jan. 25, 2000

[54] ELECTRIC COUNTERTOP GRILL

[75] Inventors: Yuan-Song Tsai, San Marino, Calif.; Michael G. Hu, Lockport, Ill.

[73] Assignee: Tsann Kuen USA, Inc., Pasadena, Calif.

[21] Appl. No.: 09/156,252

[22] Filed: Sep. 18, 1998

[51] Int. Cl.[7] .............................. A23L 29/02; A47J 29/02
[52] U.S. Cl. ................................ 99/341; 99/375; 99/377; 99/391; 99/400
[58] Field of Search ........................... 99/339, 372, 377, 99/376, 378, 375, 379, 380, 391, 341, 400

[56] References Cited

U.S. PATENT DOCUMENTS

| | | | |
|---|---|---|---|
| 1,556,767 | 10/1925 | Dodge, Jr. | 99/339 |
| 1,609,317 | 12/1926 | Smith | 99/339 |
| 2,209,677 | 7/1940 | Flamm | 99/339 |
| 3,098,924 | 7/1963 | Salton et al. | 99/341 X |
| 4,487,116 | 12/1984 | Routhier | 99/339 |
| 5,606,905 | 3/1997 | Boehm et al. | 99/375 |

OTHER PUBLICATIONS

Salton/Maxim Housewares, Inc.; Owner's Manual for the Model No. GR20 sold under the trademark George Foreman's Lean Mean Fat Reducing Grilling Machine, 1995.

*Primary Examiner*—Reginald L. Alexander
*Attorney, Agent, or Firm*—Loyal McKinley Hanson

[57] ABSTRACT

An electric grill for cooking hamburgers and other foodstuffs includes a first grill plate assembly adapted for use atop a kitchen countertop, table top, or other horizontal support surface, a second grill plate assembly connected by a hinge arrangement to the first grill plate assembly in a clamshell arrangement, and a bun warmer portion of the second grill plate assembly that defines a compartment adapted to hold at least one bun (e.g., a hamburger bun) in order to warm the bun. In one embodiment, the bun warmer portion of the second grill plate assembly includes a metal plate adapted to support the bun, and a vented transparent lid over the plate. The first grill plate assembly may include an electric grill plate with an inclined cooking surface that slopes to facilitate grease runoff to a drip tray, and components in the form of leg extensions for adjusting the height of the first cooking surface above the horizontal support surface.

9 Claims, 2 Drawing Sheets

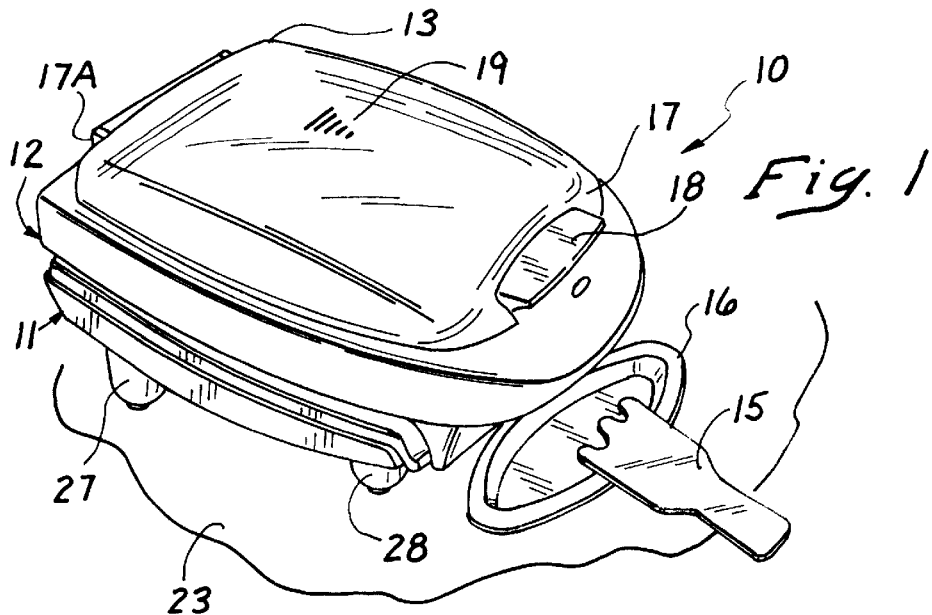
Fig. 1
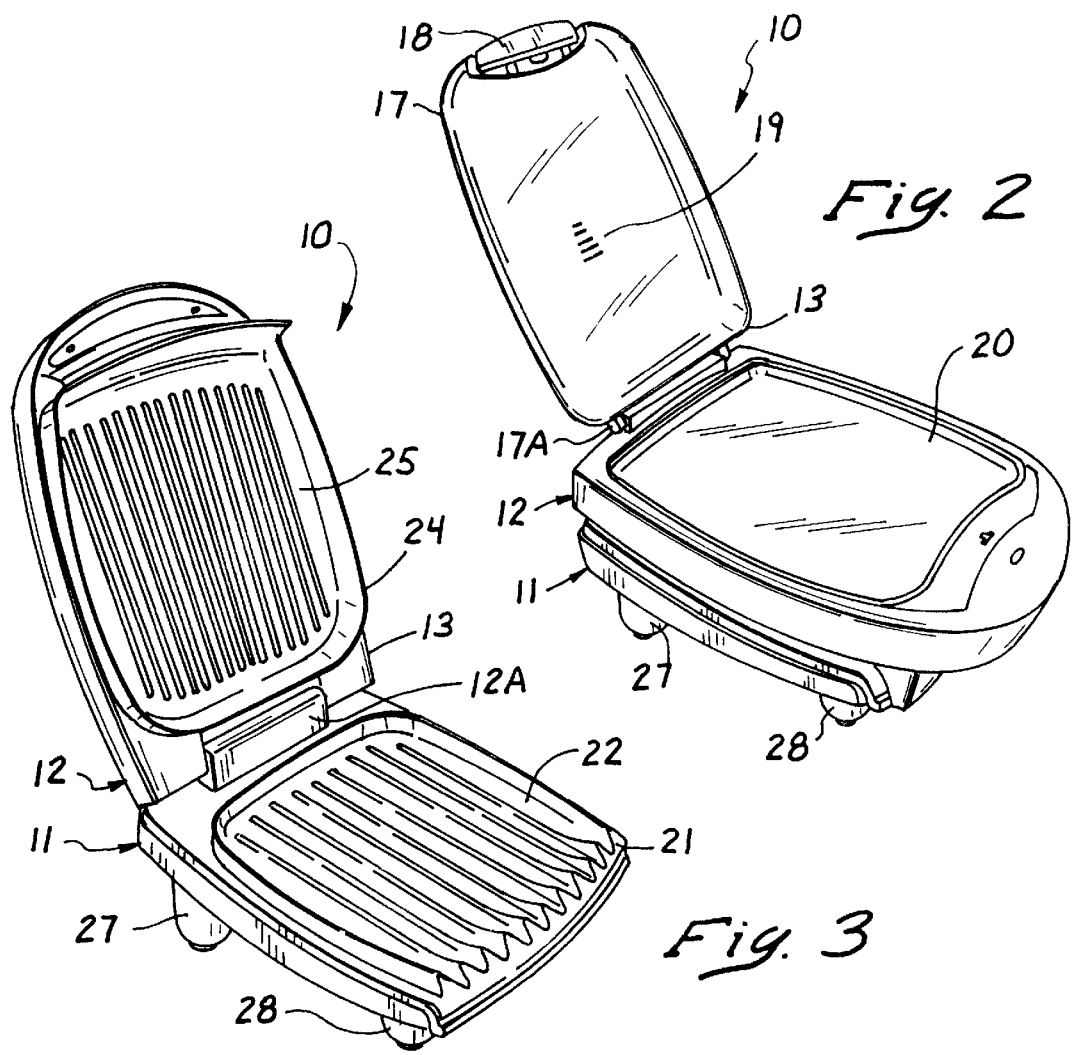
Fig. 2
Fig. 3

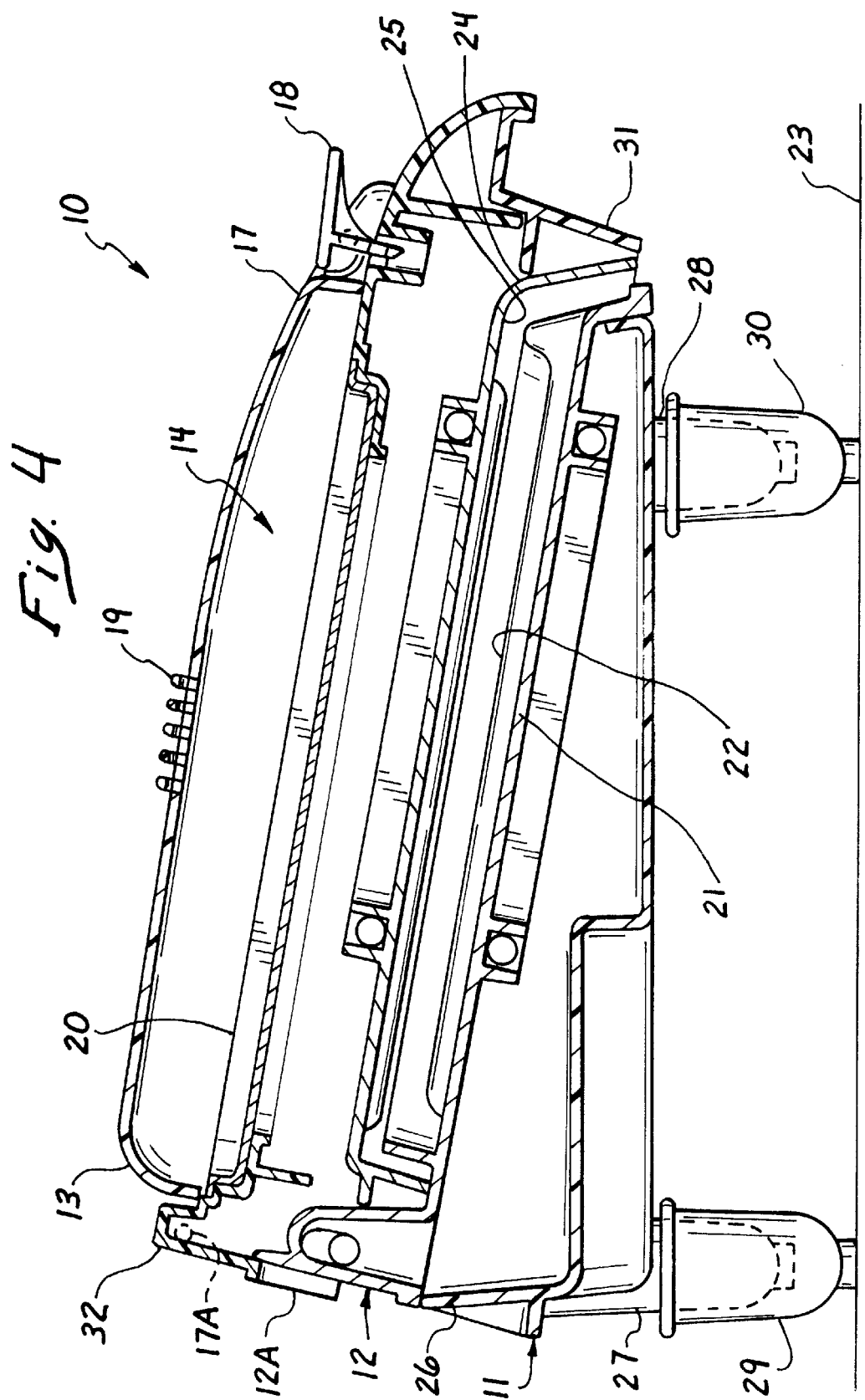

ELECTRIC COUNTERTOP GRILL

BACKGROUND OF THE INVENTION

1. Technical Field

This invention relates generally to cooking appliances and more particularly to electric grills of the type having two grill plate assemblies hinged together in a clamshell arrangement for use on a table or countertop, including electric grills having inclined grill plates that facilitate grease runoff.

2. Description of Related Art

U.S. Pat. No. 5,606,905 describes an electric countertop grill having upper and lower grill plates that are connected by a hinge in a clamshell arrangement. The user places foodstuffs on the inclined lower grill plate and then closes the upper grill plate down upon it. Held between the two grill plates that way, the foodstuffs cook on both sides simultaneously and more quickly while grease runs down the inclined lower grill plate away from the foodstuffs into a drip tray.

Electric grills of this type continue to enjoy significant commercial success and they have become the cooking appliance of choice for many health conscience hamburger lovers. Hamburger patties cook noticeably quicker and the lower grill plate channels off significant quantities of grease to the drip tray. One problem, however, is that the user must still resort to an oven, stove top, or other appliance to warm the hamburger buns. Thus, manufacturers and users seek some way to alleviate that concern.

SUMMARY OF THE INVENTION

This invention addresses the need outlined above by providing an electric countertop grill that includes a bun warmer. The grill includes upper and lower grill plate assemblies that are hinged together in a clamshell arrangement, and the upper grill plate assembly includes a portion that defines a compartment adapted to hold at least one bun for purposes of warming the bun. Preferably, the compartment holds more than one bun and the portion of the upper grill assembly that defines the compartment includes a metal plate upon which the buns are placed, with the metal plate so arranged as to derive heat from the upper grill plate assembly.

Thus, the user need not use an oven or other appliance for warming the buns. The electric countertop grill is the only appliance needed.

To paraphrase some of the more precise language appearing in the claims, an electric grill constructed according to the invention includes a first grill plate assembly, a second grill plate assembly connected to it, and a portion of the second grill plate assembly that defines a compartment adapted to hold at least one bun. The first grill plate assembly is adapted for use atop a horizontal support surface in the sense that it is suitably sized for that purpose, and it includes a first grill plate having an upwardly facing first cooking surface. The second grill plate assembly is connected by a hinge arrangement to the first grill plate assembly, and it includes a second grill plate with a downwardly facing second cooking surface. The portion of the second grill plate assembly that defines the compartment is adapted to hold at least one bun in order to warm the bun with heat derived from the second grill plate.

Although the grill plates need not be inclined within the broader inventive concepts disclosed, they are inclined in the illustrated embodiment of the invention. In addition, the portion of the second grill plate assembly that defines the compartment includes a nonstick coated metal plate for supporting the bun. The plate is supported spaced apart from the second grill plate so that heat from the second grill plate heats the plate just enough to warm the bun. A vented transparent lid over the compartment helps hold the heat in.

Stated another way, an electric countertop grill constructed according to the inventions includes first and second grill plate assemblies that are hinged together in a clamshell arrangement. A portion of the second grill plate assembly defines a compartment that is adapted to hold at least one bun for purposes of warming the bun. The following illustrative drawings and detailed description make the foregoing and other objects, features, and advantages of the invention more apparent.

BRIEF DESCRIPTION OF THE DRAWINGS

FIG. 1 of the drawings is a perspective view of an electric countertop grill constructed according to the invention;

FIG. 2 is another perspective view of the grill with the cover of the bun warmer portion in an open position;

FIG. 3 is yet another perspective view with the top grill plate assembly in an open position; and FIG. 4 is an enlarged left side view of the grill with portions in cross section.

DESCRIPTION OF A PREFERRED EMBODIMENT

FIGS. 1–3 are perspective views of an electric countertop grill 10 constructed according to the invention, and FIG. 4 is an enlarged cross sectional view. Generally, the grill 10 includes a first or lower grill plate assembly 11, a second or upper grill plate assembly 12, and a bun warmer portion 13 of the upper grill plate assembly 12 (FIGS. 1–4). The bun warmer portion 13 defines a bun warmer compartment 14 (FIG. 4) that is adapted to hold at least one bun (e.g., a hamburger bun) in order to warm the bun.

Apart from the bun warmer portion 13, the grill 10 may be similar in many respects to the cooking device described in U.S. Pat. No. 5,606,905, and that patent is incorporated herein by reference for the related details of construction provided. The grill 10 includes a power cord (not shown) that plugs into a conventional electric outlet in order to supply power to the lower and upper grill plate assemblies 11 and 12, and a floating hinge arrangement 12A (FIG. 3) connects the lower and upper grill assemblies 11 and 12 together in a clamshell arrangement. It is a clamshell arrangement in the sense that the upper grill assembly 12 can be pivoted upwardly away from the lower grill assembly 11 to an open position, and then be closed back down upon foodstuffs placed between the two grill plate assemblies. The grill 10 may include a plastic spatula 15 and a 9.5-inch long by 3-inch wide by 0.75-inch high plastic drip tray 16 of the type accompanying the commercially available grilling appliance sold under a GEORGE FOREMAN GRILL trademark by Salton/Maxim Housewares, Inc. of Mount Prospect, Ill.

The bun warmer portion 13 of the upper grill plate assembly 12 is a significant difference, however. The bun warmer portion 13 includes an upwardly disposed portion of the upper grill assembly 12 that will be identified and described later with reference to FIG. 4. The bun warmer portion 13 also includes a lid 17 that is connected to that upwardly disposed portion of the rest of the upper grill assembly 12 by a hinge 17A (FIGS. 1, 2, and 4). Although the leadline for the numeral 13 extends to the lid 17, it is intended as a general designation of all the various parts of the bun warmer portion 13.

The lid 17 is shown in FIG. 1 in a closed position where it is held by a latch arrangement 18. The lid 17 is composed of a heat resistant transparent material (e.g., a polycarbonate), and a vent 19 in the form of one or more openings through the lid 17 is provided for venting purposes. FIG. 1 also shows the grill 10 with the upper grill plate assembly 12 closed upon the lower grill plate assembly 11 in a closed or cooking position.

FIG. 2 shows the lid 17 of the bun warmer portion 13 in an open position that exposes a nonstick coated metal plate 20. The metal plate 20 is also part of the bun warmer portion 13. With the lid 17 in the open position, the user places one or more buns upon the plate 20 and then closes the lid 17 to the closed position shown in FIG. 1. That readies the buns for warming with heat from the upper grill plate assembly 12.

Before doing so, however, the user normally moves the upper grill plate assembly 12 to the open position illustrated in FIG. 3 in order to place the hamburger patties or other foodstuffs between the lower and upper grill plate assemblies 11 and 12. That exposes an electric first grill plate (referred to as lower grill plate 21) that is part of the lower grill plate assembly 11. The lower grill plate 21 has a first or lower cooking surface 22 that faces upwardly, inclined to a horizontal countertop 23 (FIGS. 1 and 4) supporting the grill 10. The user places the hamburger patties or other foodstuffs to be cooked (not shown) on the lower cooking surface 22.

The upper grill plate assembly 12 also includes an electric grill plate referred to as a second or upper grill plate 24 (FIG. 3). The upper grill plate 24 has a second or upper cooking surface 25. Moving the upper grill plate assembly 12 to the closed position results in the upper cooking surface 25 facing downwardly toward the lower cooking surface 22, with the hamburger patties or other foodstuffs held between the lower and upper cooking surfaces 22 and 25.

Refer now to FIG. 4 for further details of construction of the illustrated embodiment and its bun warmer portion 13. The lower grill plate assembly 11 includes a lower support structure or lower housing 26 that is fabricated of plastic or other suitably rigid and heat resistant material. The lower housing 26 supports the lower grill plate 20 (and the rest of the grill 10) atop the countertop 23. The lower housing 26 includes four legs for that purpose. Only the two legs 27 and 28 being visible in FIGS. 1–4, but the other two legs are physically similar to them.

Four leg extensions fit removably over the four legs in order to elevate the first cooking surface 21 higher than it would be without the leg extensions. Just the two leg extensions 29 and 30 are visible in FIG. 4, but the other two leg extensions are physically similar to them. All the leg extensions measure about two inches high and serve to elevate the first cooking surface 21 an additional three-fourths of an inch from the level illustrated in FIGS. 1–3 to the level illustrated in FIG. 4. The user slips the leg extensions over the legs whenever it is desired to elevate the first cooking surface 21. Elevating the first cooking surface 21 is desirable, for example, when the user cooks foodstuffs that the user will push down the first cooking surface 21 onto a tortilla. The user holds the tortilla in the position normally occupied by the drip tray 16.

The upper grill plate assembly 12 also includes a support structure or upper housing 31 It is also fabricated of plastic or other suitably rigid and heat resistant material. The floating hinge arrangement 12A connects the upper housing 31 to the lower housing 26, and the upper housing 31 supports the upper grill plate 24 for movement between the open and closed positions of the upper grill plate assembly 12 previously described. Electric wiring (not shown) is routed suitably through the hinge arrangement 12A to the upper grill plate 24.

The upper housing 31 includes an upwardly disposed portion 32 that supports the plate 20, the lid 17, and the hinge arrangement 17A, while cooperating with the plate 20 and the lid 17 to define the bun warmer compartment 14. The illustrated plate 20 is formed from sheet metal stock (e.g., steel) measuring about 0.1–0.5 inch thick. It is provided with a nonstick coating. The upwardly disposed portion 32 of the upper housing 31 is arranged to support the plate 20 spaced apart from the upper grill plate 24. Spacing is such that with the grill plate 24 reaching temperatures in the neighborhood of 370–420 degrees Fahrenheit, the plate 20 reaches a bun warming temperature in the neighborhood of about 220–250 degrees Fahrenheit. Depending on the precise details of design, about 0.5–1.5 inches of spacing achieves the desired bun warming temperature.

As a further idea of size, the illustrated grill 10 measures about 7.5 inches in overall height with the leg extensions on. The bun warmer compartment 14 measures about 9.5 inches long, 7.5 inches wide, and 1.5 inches high, providing more than adequate space for holding four large hamburger buns. Of course, those specifics may vary significantly within the scope of the claims and without departing from the broader inventive concepts disclosed.

Thus, the invention provides an electric countertop grill that includes a bun warmer. The user need not use an oven or other appliance for warming the buns. The electric countertop grill is the only appliance needed. And the invention may be applied to any of various clamshell-like grill configurations. Although an exemplary embodiment has been shown and described, one of ordinary skill in the art may make many changes, modifications, and substitutions without necessarily departing from the spirit and scope of the invention.

What is claimed is:

1. An electric grill, comprising:
    a first grill plate assembly, the first grill plate assembly including a first electric grill plate having a first cooking surface;
    a second grill plate assembly, the second grill plate assembly including a second electric grill plate having a second cooking surface;
    a hinge arrangement connecting the first and second grill plate assemblies, the hinge arrangement being adapted to enable a user to place foodstuffs between the first and second cooking surfaces; and
    a portion of the second grill plate assembly that defines a compartment adapted to hold at least one bun in order to warm the bun with heat derived from the second grill plate;
    wherein the portion of the second grill plate assembly that defines the compartment includes a lid over the compartment, which lid is at least partially transparent and includes a vent.

2. An electric grill as recited in claim 1, wherein the portion of the second grill plate assembly that defines the compartment includes a plate within the compartment that is adapted to support the bun, which plate is supported spaced apart from the second grill plate so that heat from the second grill plate heats the plate in order to thereby warm the bun.

3. An electric grill as recited in claim 2, wherein the plate is composed of a metal alloy with a nonstick covering.

4. An electric grill as recited in claim 1, wherein the first grill plate assembly is arranged so that the first cooking surface is inclined relative to the horizontal support surface in order to facilitate grease run off.

5. An electric grill, comprising:

a first grill plate assembly, the first grill plate assembly including a first electric grill plate having a first cooking surface;

a second grill plate assembly, the second grill plate assembly including a second electric grill plate having a second cooking surface;

a hinge arrangement connecting the first and second grill plate assemblies, the hinge arrangement being adapted to enable a user to place foodstuffs between the first and second cooking surfaces;

a portion of the second grill plate assembly that defines a compartment adapted to hold at least one bun in order to warm the bun with heat derived from the second grill plate; and means for adjusting the height of the first cooking surface above the horizontal support surface, said means including four leg extensions.

6. An electric grill as recited in claim 5, wherein the portion of the second grill plate assembly that defines the compartment includes a plate within the compartment that is adapted to support the bun, which plate is supported spaced apart from the second grill plate so that heat from the second grill plate heats the plate in order to thereby warm the bun.

7. An electric grill as recited in claim 6, wherein the plate is composed of a metal alloy with a nonstick covering.

8. An electric grill as recited in claim 5, wherein the portion of the second grill plate assembly that defines the compartment includes a lid over the compartment, which lid is at least partially transparent and includes a vent.

9. An electric grill as recited in claim 5, wherein the first grill plate assembly is arranged so that the first cooking surface is inclined relative to the horizontal support surface in order to facilitate grease run off.

* * * * *